Patented June 27, 1950

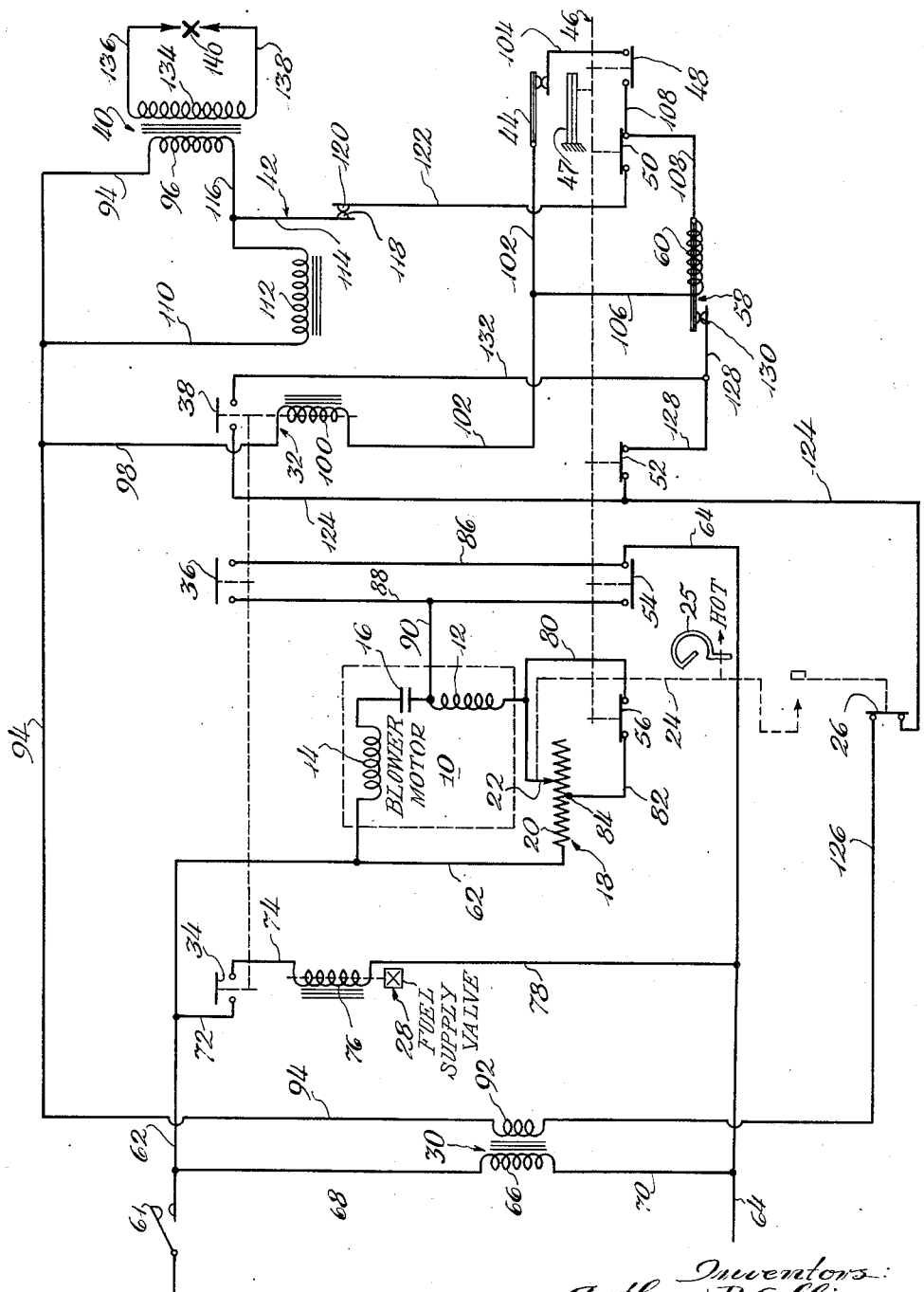

2,512,919

UNITED STATES PATENT OFFICE 2,512,919

DEVICE FOR CONTROLLING A HEATER IN RESPONSE TO THE HEATER COMBUSTION CONDITIONS

Arthur R. Collins, Park Ridge, and Frank A. Ryder and Ross D. Randall, Chicago, Ill., assignors to Stewart-Warner Corporation, Chicago, Ill., a corporation of Virginia Application April 13, 1946, Serial No. 661,970

7 Claims. (Cl. 158—28)

The present invention relates to heater controls and, more particularly, to mechanism for controlling heaters of the type forming the subject matter of a patent application by Theodore Y. Korsgren, Serial No. 626,837, filed November 5, 1945, now Patent No. 2,482,552, granted September 20, 1945, for "Gas Heaters" and an application of Frank A. Ryder, Serial No. 622,429, filed October 15, 1945, now Patent No. 2,502,345, granted March 28, 1950, for "Heaters." These applications are assigned to the assignee of this application. The control mechanism of this invention may be considered as an improvement over the similar mechanism disclosed in the above referred to application of Frank A. Ryder.

A heater of the type described in the above applications comprises a variable speed electric motor which drives a combustion air blower and a ventilating air blower. These two blowers are used to circulate air through the heater proper wherein the ventilating air is heated and the combustion air is mixed with fuel gas and burned. The rate of flow of fuel gas to the burner is controlled by a pressure regulator which in turn is responsive to the rate of flow of combustion air, such that the mixture ratio is always kept substantially constant regardless of the combustion air rate. A heater of this type is easy to regulate, since the heat output can be increased or decreased by the simple expedient of increasing or decreasing the speed of the electric motor. The electric motor speed in turn is controlled either automatically or manually by a variable reactance which increases or decreases the voltage across the motor according to the need for heat.

It is an object of the present invention to provide an improved control system for a heater of the above type which will be safe if any of the electric circuits forming components thereof fail to operate, and which will automatically perform all of the control functions desirable in a heater of this type.

An additional object of the present invention is to provide a novel heater control system including spark ignition means for the heater which can be manufactured at low cost and which can be accommodated in minimum space.

Yet another object of the present invention is to provide an improved control for a heating system of the above type which will prevent the fuel from being turned on unless the ignition system is in condition for operation, which will turn off the ignition soon after the heater has started, and which will turn off the heater if the demand for heat is less than is normally supplied by the heater when operating at its minimum efficient output level.

Still another object of the present invention is to provide a heater having spark ignition which is turned off thermostatically soon after the heater starts, with safety means for preventing fuel from being turned on unless the heater has cooled sufficiently following previous operation to permit the ignition system again to be placed in operating condition.

Yet another object is to provide a heater control system which modulates the heat output of the heater, but which always insures that the heater is started at a high enough output level to insure efficient starting and which cools the heater and removes residual fuel therefrom before the heater blower is de-energized following a heating cycle.

Still another object is to accomplish all of the above with a minimum of control mechanism and at reasonable cost.

Other objects and advantages will become apparent from the following description of a preferred embodiment of our invention.

The drawing is a diagrammatic illustration of an electrical circuit which includes a preferred embodiment of the present invention.

The electric motor previously referred to is indicated generally in the drawings by the numeral 10 and includes a main winding 12 and an auxiliary winding 14 connected in parallel with the main winding by way of a capacitor 16. The modulator or controller for varying the speed of the motor 10 includes a variable resistor 18 having a resistance coil 20 and a slider 22. When the slider reaches the high resistance end of the coil 20, it is mechanically connected as indicated by the dashed line 24 to open a normally closed switch 26 provided in the motor circuit as will be described in more detail presently. The mechanical connection 24 includes a lost motion connection and is operated by the room or space temperature thermostat 25.

In addition to the motor and controller just described, the components in the circuit include a magnetic fuel valve 28 of the type which permits flow of fuel gas to the heater only when energized; a control transformer 30 which steps down the line voltage of approximately 115 volts to a control voltage of approximately 24 volts, and a relay 32 having three separate sets of normally open contacts indicated by the numerals 34, 36 and 38. The circuit also includes a spark coil 40 and a vibrator 42 therefor. A safety switch 44 of the thermostatic type is located so as to be responsive to the exhaust temperature of the heater and operates in a manner to be described presently to shut off the heater if the exhaust temperature rises to too high a level, since this indicates that the heater is overheating as might occur, for instance, if the ventilating air is not flowing in sufficient quantity. The circuit also includes a flame detector, indicated generally by the numeral 46. This detector is associated with the combustion chamber of the heater in a well known manner so that it responds quickly by means of a combustion responsive thermostat 47 to the presence of combustion therein. The detector includes five sets of contacts, indicated by the numerals 48, 50, 52, 54 and 56. Of these, 48 and 54 are normally open while 50, 52 and 56 are normally closed. At a predetermined temperature the open contacts are closed and the closed contacts are opened. For purposes to be described presently, the circuit also includes a lock-open type time delay safety switch 58 which may be of the bimetal thermostatic type having an electric heating element 60. This switch is so designed that if the heating element 60 is energized for a period of approximately 45 seconds, the heated thermostatic blade will be deflected so as to open a circuit through the switch. After operating, the switch locks in the open position until manually reset. A suitable switch of this type is described in the copending application of Ross D. Randall for "Time Delay Switch" filed January 5, 1946, and which has been given Serial No. 643,329, and issued on March 23, 1948, as Patent No. 2,438,186. This patent is assigned to the assignee of this application.

The electric circuit receives its energy from a heater line which includes a heater switch 61. This line is represented by the wires 62 and 64 and is connected across the primary 66 of the step-down control transformer 30 by way of leads 68 and 70. The lead 62 is also connected by way of a branch 72 to one of the contacts in the set 34 of the relay 32, the other contact of the set being connected by a wire 74 to the magnetic coil 76 of the fuel valve 28, the opposite end of this coil being connected to the other side of the circuit at the line 64 by a conductor 78.

An extension of the lead 62 is also connected to one end of the auxiliary motor winding 14 and to one end of the resistance coil 20. The other end of the auxiliary motor winding 14, as previously mentioned, is connected through the capacitor 16 to the main motor winding 12 and through the main winding to the slider 22. The slider is also connected by a lead 80 to one of the contacts of set 56 of the flame detector 46, the other contact of this set being connected by a wire 82 to a tap 84 at approximately the fifty per cent point on the resistance coil 20. The other side 64 of the main line is connected to one of the contacts of the set 54 of the flame detector and by an extension of this side of the circuit, represented by the wire 86, to one of the contacts of the set 36 of the relay 32. The other contact of the set 36 is connected by a lead 88 to the other contact of the set 54 of the flame detector and this lead is also connected by a branch 90 to a point between the main motor winding 12 and the capacitor 16.

The control transformer secondary 92 is connected at one side by a wire 94 to one end of the primary 96 of the spark coil 40. This side of the line, that is, 94, is also connected by a branch 98 with one end of the magnetic coil 100 of the relay 32, the other end of this coil being connected by a wire 102 to one end of the overheat safety switch 44, the other end of which is connected by a lead 104 to one of the contacts of the set 48 in the flame detector. The lead 102 is also connected by a branch 106 to one end of the electric heater 60 of the lock-open safety switch 58, the other end of this heating element being connected to the switch blade of the lock-open switch which is also connected by a wire 108 to one of the contacts of the set 50 off the flame detector and also to the contact of the set 48 not connected to the lead 104. A lead 110 also connects the side 94 of the control circuit with the magnetic coil 112 of the vibrator 42, the other end of this coil being connected by a wire 116 to the vibrating blade 114 and also to the end of the primary 96 of the spark coil not connected to the line 94. The vibrating blade 114 has a contact 118 which co-operates with a stationary contact 120 connected by a lead 122 with the contact of the set 50 not directly connected to the lock-open type safety switch 60.

One of the contacts of the set 38 of the relay 32 receives energy through a lead 124 by way of the previously described switch 26, the other side of which is connected by a line 126 to the other end of the control transformer secondary 92. The wire 124 also leads to one of the contacts of the set 52 of the flame detector while the other contact of this set is connected by a lead 128 to the stationary member of the contact set 130 of the lock-open type switch 58, the movable blade having the other contact and being connected to the wire 108 and heating element 60, as previously mentioned. A branch 132 leads from the wire 128 to the contact set 38 so as to place the contact sets 38 and 52 in parallel.

The secondary 134 of the spark coil 40 is connected by leads 136 and 138 across the spark plug igniter indicated at 140.

The control system described operates in the following manner. The circuit as illustrated is in the "at rest" position. That is, it is assumed that no energy is impressed across the lines 62 and 64. Under these conditions, the relay contacts 34, 36 and 38 are open as are the flame detector contacts 48 and 54. On the other hand, the flame detector contacts 50, 52 and 56 are closed. The switch 26, the overheat control 44 and the lock-open type safety switch 58 are also closed. The slider 22 of the motor controller may be at any point, but for the purpose of discussion, it will be assumed that it is toward the high resistance end of the coil 20 so as to operate the motor 10 at low speed.

If, now, electric energy is impressed across the leads 62 and 64, for instance, by closing switch 61, the primary 66 of the transformer 30 is energized. This produces a control voltage across the leads 94 and 126 with the result that the relay coil 100 and heating element 60 are energized, these being in series and connected across the line by way of wires 98, 102, 106, contacts 130, lead 128, contacts 52, wire 124, and switch 26. The relay 32, therefore, closes and the heater 60 begins heating the bimetal blade of the lock-open type switch 58. Meanwhile, the ignition spark coil 40 and vibrator 42 are energized through the vibrator contacts 118 and 120, wire 122, contacts 50, wire 108, and switch contacts 130, the remaining portion of this circuit being the same as that for the relay coil 100. Inasmuch as the vibrator coil 112 and spark coil primary 96 are in parallel and are energized through the contacts 118 and 120, rapid making and breaking of these contacts will produce an interrupted alternating current in the primary 96 of the spark coil 40, thereby energizing the secondary 134 and producing a spark at the igniter 140. We have found that this system, since it causes the current to fluctuate in the spark coil primary much more rapidly than if the coil is simply connected across the 60-cycle alternating current leads, makes it possible to use a spark coil that is smaller, lighter, and less expensive than is necessary when an ordinary 60-cycle alternating current transformer of conventional type is used.

Energizing the relay coil 100 closes the contact sets 34, 36 and 38. Of these, the set 34 when closed energizes the fuel valve 76 in series therewith across the lines 62 and 64. When the contact set 38, in parallel with the contacts 52, closes, it operates a holding circuit for the relay coil 100 to be described presently. So long as the flame detector contacts 52 remain closed, the contacts 38 do not affect the circuit except to condition it for future operation. Closing of contacts 36 energizes the motor 10 by way of line 62, the auxiliary motor winding 14, the capacitor 16, to branch 90, wire 88, contacts 36, wire 86 and to the other side of the line 64. The main winding of the motor is also energized from the line 62 by way of a portion of the resistance coil 20 to the fifty per cent point 84, and thence from this tap to the wire 82, through the contacts 56, wire 80 and main winding 12 to the branch 90 previously mentioned. If the slider 22 is at less than the fifty per cent tap 84, the principal portion of the main winding current will flow through the slider 22 to the winding 12 rather than by way of the fifty per cent tap and contacts 56. The motor, therefore, starts easily and operates at a speed such that the rate of combustion air and fuel gas supply is proper to operate the heater at at least fifty per cent of its capacity. This is done because the heater characteristics are such that it will normally operate at a much lower heat output than can be used for starting purposes. Also, the motor is more certain of starting if it is not attempted to start it at its lowest speed. For both these reasons, it is advisable to place the heater motor in operation at a higher rate of speed than may be useful for modulating purposes subsequently.

Inasmuch as the motor 10 is operating so as to supply combustion air and ventilating air, and since gas is flowing to the heater through the fuel valve 28 and since there is sparking at the igniter 140, combustion starts almost instantaneously. As soon as combustion has been established, the flame detector thermostat 47 starts heating and normally will shift the position of its contacts in approximately 20 seconds. If it fails to do this for a period of 45 seconds or so, this being the time delay characteristic of the lock-open type switch 58, it will ordinarily indicate that something is wrong with the ignition circuit, that for some reason gas is not being supplied to the heater, that the motor 10 is not operating properly, or possibly that something has happened to the circuit connecting these elements. In any event, if the heater does not start in 45 seconds, the contacts 130 separate and are locked in the separated position. This de-energizes the heating element 60, but because the switch is locked it will not reclose. Also, it de-energizes the relay coil 100, thereby opening the contacts 34, 36 and 38. This de-energizes the fuel valve 28 so as to turn off the flow of gas to the heater. The motor 10 is also de-energized when contacts 36 open. In addition, since the contacts 130 of the lock-open switch are separated, the spark coil 40 and the vibrator 42 will be de-energized. The heater, therefore, remains completely de-energized, except for the windings of the control transformer 30, until the heater has been repaired and the lock-open switch 58 manually reclosed.

If the heater functions normally, the flame detector will be operated in approximately 20 seconds, thereby closing contacts 48 and 54 and opening contacts 50, 52 and 56. Opening of contacts 50 disconnects the vibrator 42 and spark coil 40, thereby turning off the ignition system, which is no longer needed once combustion has been established. Closing of contacts 48 shorts out the heater 60, thereby permitting this heating element and the thermostatic element of the lock-open switch 58 to cool. Also, as will be described presently, it conditions the circuit for subsequent action of the overheat switch 44. Switch 58, therefore, does not open if the heater functions normally, since it is heated for only approximately 20 seconds of the necessary 45-second interval. Opening of contacts 52 does not affect the circuit since these contacts are in parallel with contacts 38 of relay 32. It, however, conditions the relay circuit so that if the relay once opens for any reason, it will not reclose until the flame detector contacts have been reclosed. Closing of contacts 54, which are in parallel with the set 36 of the relay 32, conditions the motor circuit so that even though the relay subsequently opens, the motor 10 will continue operating until the flame detector cools to the point where it shifts from the hot condition to the cold condition. Contacts 56, which are also opened by the flame detector, disconnect the fifty per cent resistance tap 84, so that the motor, instead of operating at about fifty per cent of its speed, will slow down to the speed necessary to give the heat output desired for the particular load conditions existing within the space to be heated, these conditions being indicated by the position of the slider 22. In other words, if only low heat output is needed for the space, the heater will start at the fifty per cent point and then, as soon as the flame detector operates, the heat output will drop to a low level which may safely be well below that at which either the motor or heater can be depended upon to start.

If, for any reason, the heater overheats, the exhaust temperature will rise and open the overheat switch 44. This removes the short from around the heating coil 60 so that this coil will again be energized through the relay coil 100 and by way of relay contacts 38, contacts 52 being normally open under these conditions. The result is that in 45 seconds the temperature of the bimetal element of switch 58 will increase to the point where the contacts 130 are separated and the switch is locked in the open position. This de-energizes the coil 100 of the relay 32 and permits contacts 34, 36 and 38 to separate. The fuel to the heater is therefore shut off, since the fuel valve coil 76 is in series with contacts 34. Separation of the contacts 36, however, does not immediately de-energize the motor 10 since contacts 54 remain closed until the flame detector cools to the starting condition. The motor, therefore, will drive the combustion and ventilating air blowers long enough to reduce the temperature of the heater considerably before the motor is shut off. Since the switch 58 has been locked in the open position, the heating system will not restart automatically, it being necessary that this switch be manually reset before starting can be effected, and this is true even though the flame detector cools and the overheat switch 44 subsequently closes.

If, during heater operation, the heat output required becomes less and less as the room temperature approaches the desirable level with the result that the slider 22 is shifted progressively farther toward the high resistance end of the variable resistor 18, it will eventually arrive at a position where the heat output from the heater is at the minimum level at which efficient combustion or positive motor operation is possible. If the slider moves any farther than this toward the high resistance end of the resistor 18, the slider mechanically opens switch 26 so as to open the secondary circuit of the control transformer 30. This de-energizes the relay 100, thereby turning off the gas valve as previously described. After this has taken place, even though someone may move the slider 22 toward the opposite end of the resistor before the heater has had an opportunity to cool, it is apparent that reclosing the contacts 26 will not start the heater immediately, since both contacts 52 and 38 are open. The result is that the relay coil 100 will not be energized and therefore the gas valve 28 remains open. This condition continues until the flame detector has cooled sufficiently to close contacts 52. The delay is desirable since it prevents gas from flowing to the heater until the ignition system has started operating.

Whenever the heater has been in operation and is then shut off, either by opening the switch 26 or by operation of the overheat switch 44, the motor will continue operating for a period so as to cool the heater, because contacts 54 do not open until the flame detector has cooled to its starting position. If the heater should go out because of a failure of the gas supply, the flame detector cools, thereby opening contacts 48 which short out the heating element 60. Thus, in approximately 45 seconds the switch 58 will lock open so as to de-energize the relay coil 100. This opens relay contacts 34 and de-energizes the fuel valve. Also, the motor is de-energized as soon as relay contacts 36 open since flame detector contacts 54 are already open. The ignition system comprised of the vibrator 42 and spark coil 50 is also de-energized when contacts 130 separate.

From the above, it is apparent that the circuit described, the safety elements of which comprise principally only one relay, one flame detector, one overheat switch, one lock-open switch, and a magnetic gas valve, accomplishes a multitude of functions, depending upon conditions within the heater. It automatically starts the heater only if the heater has cooled sufficiently from the last cycle to place the ignition system in operation, it turns off and prevents automatic restarting of the heater if it has been overheated or if it has not started promptly or if the gas supply has failed, and it also starts the heater at a comparatively high level and operates it at this level for a matter of 20 seconds or so before permitting the heater to shift to low level operation, even though the conditions in the room call for low level operation. Further, failure of the electric power supply will permit the fuel valve 28 to close so as to turn off the heater, but will not prevent restarting as soon as the power supply has been re-established, while failure of the control circuit from the transformer 30 will cause the relay 32 to open, which in turn turns off the fuel valve 28. Also, whenever the heater is shut off, the motor 10 is operated a sufficient period to cool the heater considerably and during this period the combustion air flows through the heater so as to sweep out any unburned gas that may be present. Also, such cooling prevents snapping and popping of the heater which normally takes place if combustion is interrupted at the same time as the flow of ventilating air is shut off.

Having described our invention, what we claim as new and useful and desire to secure by Letters Patent of the United States is:

1. In a heater control device for a heater having a blower motor for operating a blower to supply air for combustion to the heater and means including fuel supply means and igniter means to initiate and support combustion in the heater, the combination of a circuit for energizing said motor including a variable speed controller, a first set of contacts, and a second set of contacts connected in parallel with said first set, both of said sets being open in the "at rest" condition, means responsive to combustion in the heater for closing said first set when said combustion responsive means reaches a predetermined temperature, means for closing said second set when the control device is energized, and a third set of contacts in said circuit connected when closed so as to render said variable speed controller ineffective to reduce the motor speed below a predetermined rate, said third set being closed in the "at rest" condition and remaining closed after energization of the heater until said predetermined temperature has been reached, said combustion responsive means opening said third set of contacts when said combustion responsive means reaches said predetermined temperature and preventing closure of said second set of contacts unless said heater has cooled following a previous cycle of operation.

2. A heater control device comprising a blower motor for operating a blower to supply air for combustion to the heater, an electrically operated fuel valve, igniter means to initiate combustion in the heater, a circuit for energizing said motor including a first set of contacts, a second set of contacts connected in parallel with said first set, and a variable speed controller for said motor, a fuel valve circuit in parallel with said motor circuit including a third set of contacts, all of said sets being open in the "at rest" condition, means responsive to combustion for closing said first set when said combustion responsive means reaches a predetermined temperature, said second and third sets being normally closed when the control device is energized, and a third circuit normally energized upon energization of said first circuit, said third circuit including electrically operated means for closing said second and third sets of contacts, a heating element, thermostatic switch means arranged to be affected by heat from said element for deenergizing said electrically operated means unless said combustion responsive means reaches the predetermined temperature within a predetermined time limit, a low resistance circuit by-passing said heating element, a set of contacts in said by-pass circuit, said last mentioned set being closed by said means for closing said first set of contacts, a normally closed set of contacts, and means including a lost motion connection interconnecting said variable speed controller and said normally closed set of contacts and adapted to open said contacts when said variable speed controller reduces the motor speed to a predetermined rate whereupon said third circuit is deenergized to open said second and third sets of contacts and said motor continues operation until the heater is cooled to the predetermined temperature to open said first set of contacts.

3. In a control system for a fuel burning heater having a fuel supply means, a motor for operating a blower for supplying combustion air to the heater and means to initiate combustion in the heater, a variable speed controller for said motor, means to shut off said motor at a predetermined position of said speed controller as said controller acts progressively to decrease the speed of said motor, means to start said motor at a higher speed than that at said predetermined position regardless of the position of said controller, and means responsive to combustion in the heater for removing the influence of said starting means after combustion has been well established and for returning control of said motor to said variable speed controller.

4. In a control system for a fuel burning heater having a fuel supply means, a motor for operating a blower for supplying combustion air to the heater and means to initiate combustion in the heater, a variable speed controller for said motor, means to shut off said motor at a predetermined position of said speed controller as said controller acts progressively to decrease the speed of said motor, means to start said motor at a higher speed than that at said predetermined position regardless of the position of said controller, means responsive to combustion in the heater for removing the influence of said starting means after combustion has been well established and for returning control of said motor to said variable speed controller, and means including said combustion responsive means for continuing operation of said motor after combustion has accidentally ceased until the heater has been cooled to a predetermined temperature.

5. In a control system for a fuel burning heater having a fuel supply means, a motor for operating a blower for supplying combustion air to the heater and means to initiate combustion in the heater, a variable speed controller for said motor, means to shut off said fuel supply means and therefore the combustion in the heater at a predetermined position of said speed controller as said controller acts progressively to decrease the speed of said motor, means to start said motor at a higher speed than that at said predetermined position regardless of the position of said controller, means responsive to combustion in the heater for removing the influence of said starting means after combustion has been well established and for returning control of said motor to said variable speed controller, and means including said combustion responsive means for continuing operation of said motor to clear the heater of burned and unburned gas and to cool the heater for another cycle of operation.

6. In a control system for a fuel burning heater having a fuel supply means, a motor for operating a blower for supplying combustion air to the heater and means to initiate combustion in the heater, a variable speed controller for said motor, means to shut off said fuel supply means and therefore the combustion in the heater at a predetermined position of said speed controller as said controller acts progressively to decrease the speed of said motor, means to start said motor at a higher speed than that at said predetermined position regardless of the position of said controller, and means responsive to combustion temperature conditions in the heater for continuing operation of said motor after combustion has been terminated to clear the heater of burned and unburned gases and to condition the control system for another cycle of operation.

7. A heater control device comprising a blower motor for operating a blower to supply air for combustion to the heater, an electrically operated fuel valve, an igniter to initiate combustion in the heater, a circuit for said motor, said circuit including a variable speed controller, a first set of contacts, and a second set of contacts in parallel with said first set, a circuit for said fuel valve including a third set of contacts, all of said contacts being open in the "at rest" condition, combustion responsive means for closing said first set of contacts when said combustion responsive means reaches a predetermined temperature, said second and third sets being closed upon energization of the control device, and a second circuit normally energized upon energization of said first circuit, said second circuit including electrically operated means which upon energization acts to close said second and third sets, a branch circuit for said igniter including a fourth set of contacts, said fourth set being closed in the "at rest" condition, a heating element, a thermostatic switch in series with said igniter circuit and with said electrically operated means and arranged to be affected by heat from said heating element, a low-resistance circuit connected to said electrically operated means by-passing said heating element, a fifth set of contacts in said bypass circuit, said fourth set of contacts being opened by said combustion responsive means to deenergize the said igniter, and said fifth set of contacts being closed by said heater temperature responsive means effectively to remove said heating element from the circuit, a switch in series with the other elements of said second circuit, and a lost motion connection between said variable speed controller and said switch adapted to actuate said switch to deenergize said second circuit thereby to terminate combustion in the heater when said variable speed controller reduces the motor speed to a predetermined rate.

ARTHUR R. COLLINS.
FRANK A. RYDER.
ROSS D. RANDALL.

REFERENCES CITED

The following references are of record in the file of this patent:

UNITED STATES PATENTS

| Number | Name | Date |
|---|---|---|
| 1,359,042 | Doble | Nov. 16, 1920 |
| 1,602,175 | Scott | Oct. 5, 1926 |
| 1,732,174 | Sweatt | Oct. 15, 1929 |
| 1,883,242 | Bogle | Oct. 18, 1932 |
| 2,119,153 | Dallenbach | May 31, 1938 |

Certificate of Correction

Patent No. 2,512,919 June 27, 1950

ARTHUR R. COLLINS ET AL.

It is hereby certified that errors appear in the printed specification of the above numbered patent requiring correction as follows:

Column 1, line 7, for "1945" read *1949*; column 4, line 13, for the word "off" read *of*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*